March 19, 1957  S. D. ROSS  2,786,165
ELECTROLYTIC DEVICE
Filed Jan. 2, 1953
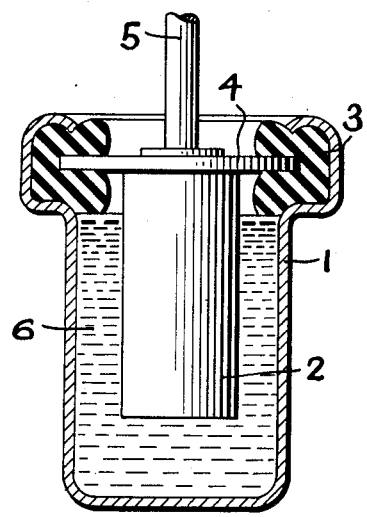
INVENTOR.
SIDNEY D. ROSS
BY
*Connolly and Hutz*
HIS ATTORNEYS

United States Patent Office 2,786,165
Patented Mar. 19, 1957

2,786,165
ELECTROLYTIC DEVICE

Sidney D. Ross, Williamstown, Mass., assignor to Sprague Electric Company, North Adams, Mass., a corporation of Massachusetts Application January 2, 1953, Serial No. 329,276

6 Claims. (Cl. 317—230)

The present invention relates to new and improved electrolyte and to electrolytic devices, such as, specifically, electrolytic capacitors utilizing the same.

In order to function satisfactorily in an electrolytic capacitor, an electrolyte must have a number of properties. It must not be corrosive to the various materials with which it comes in contact during use of the capacitor, and in addition, it must not be corrosive to the various pieces of apparatus which are usually utilized in association with capacitors and the like containing such electrolytes. Obviously, if the electrolyte fails in either of these two important respects, its applications are severely limited.

Also, electrolytes for use with such apparatus as electrolytic capacitors must be stable over a wide range of temperatures, and must possess relatively high boiling points and comparatively low freezing points. In order that an electrolytic unit containing such an electrolyte possess relatively constant operating characteristics over a wide range of temperatures, this electrolyte must have what amounts to a substanially constant temperature coefficient of conductivity. It follows almost without saying that the electrolyte must be conducive over this same range of temperatures.

In addition to possessing relatively high conductivity, an ideal electrolyte for electrolytic capacitors is required to have good film-forming and maintaining properties, both during use, as well as during operation of an electrolytic unit. Its surface tension must be such that when utilized in units having relatively small passages for the electrolyte to traverse in coming in contact with all portions of formed electrodes, that it can penetrate these passages with relative ease.

Also, one major characteristic of a satisfactory electrolyte for commercial applications is that it must be relatively cheap in cost. The field of electrolytic condensers today is highly competitive, and the difference of a few cents in the total cost of the unit may mark the difference between success and failure commercially.

A great many compositions have been suggested as electrolytes and practically all of them have been seriously deficient in one or more of the above desiderata. One of the most frequent causes of difficulty results from the corrosive tendency of one or more of the components or of certain ions within these electrolytes. Lithium chloride is an example of this. It has previously been used with electrodes of tantalum and other similar relatively "inert" film-forming metal electrode containing devices. This particular compound cannot be used with the relatively cheap and easily formed present day aluminum electrodes because of the corrosive characteristics of the chloride ion.

It is an object of the present invention to overcome the aforegoing and related disadvantages of the prior art, and to produce an electrolyte which is highly advantageous because of its superior properties in practically all of the above criteria. A further object is to produce electrical components, such as electrolytic capacitors, utilizing this electrolyte. These and further objects of the present invention, as well as the advantages of it, will be apparent from the following description and claims, as well as the appended drawing in which:

Figure 1 shows a partially cross-sectional view of an electrolytic capacitor employing an electrolyte of the present invention.

Briefly, the objects of the invention are achieved by forming an electrolyte consisting of a solution of an inorganic oxidizing agent which is non-deleterious with respect to the materials with which it is used under operating conditions. The preferred oxidizing agents of the invention are highly soluble alkali metal salts of acids selected from the group consisting of chromic, di-chromic, manganic, permanganic, molybdic, nitric, vanadic. The preferred solvent with the invention is water although numerous other non-aqueous solvents, such as ethylene glycol, propylene glycol, propionitrile, dimethyl formamide, tertiary butyl phosphate, and the like, or mixtures thereof can be used providing the solute employed is sufficiently soluble.

In its more limited embodiments, the present invention is concerned with electrolytic capacitors employing formed aluminum anodes which use the above indicated electrolyte. In one of the preferred species of the invention, this anode is a compressed sintered porous pellet of the broad type shown in the R. U. Clark Patent No. 2,539,970.

Obviously, the amount of any solute employed in an electrolytic solution will vary, depending upon the specific application involved. In general, it is preferred to use an amount of one of the above solutes to form an aqueous electrolytic solution in which the conductance corresponds substantially to the point of maximum conductance determined as a result of plotting conductivity for varying amounts of the solute in water. Those skilled in the art will be, of course, able to determine this point with a minimum of experimentation. For many of the preferred electrolytes it appears to be best to use between about 5 and 10 moles of the alkali metal salts indicated per liter of solution.

The actual application of the present invention is most easily explained with reference to the appended drawing showing the preferred species of electrolytic capacitors utilizing the indicated electrolytes. Here there is shown an aluminum can 1 containing an aluminum powdered anode 2 of the type described in the aforesaid Clark patent. This anode is held within the can by means of a gasket 3 attached to a top flange 4 positioned around the base of the anode 2. Connected to this flange is an appropriate terminal lead 5. The electrolyte 6 utilized fills the space between can 1 and the anode 2, and consists in this example of an 8 molar aqueous solution of lithium chromate.

Other electrolytes within the scope of this disclosure are:

7.0 molar solution lithium nitrate in ethylene glycol; 6.0 molar aqueous solution of potassium molybdate; 8.0 molar aqueous solution of sodium permanganate; 5.0 molar aqueous solution of lithium dichromate; 10 molar solution of sodium vanadate in dimethyl formamide. It should be noted that all of the electrolytes cited above are characterized by relatively high concentrations, at least five molar, of solute. These and other electrolytic solutions coming within the scope of the present invention upon reduction, form non-deleterious products.

The fact that a single species of the electrolytic capacitors of the invention has been illustrated is not to be taken as detracting from the utility of those electrolytes shown and described with any of the conventionally formed anodes presently used in the condenser industry. In particular, the electrolytic solutions described can be used with various etched foil units with the so-called fabricated plate type of electrolytic capacitor, as well as with still other specialized constructions. Although the preferred metal for use with these electrolytes is aluminum because of its cheapness, availability, and ease of formation, manipulation, etc., other metals, such as tantalum, zirconium, palladium, etc., can also be used.

All of these materials, when used with the present invention are preferably formed in the various means known and used in the art, although it is possible to form them in the specific electrolytes herein set forth. This formation procedure with aluminum normally involves the oxidation of an electrode in a bath saturated with boric acid or a similar compound by holding it in such a bath while making it an electrode of an electrolytic system and while subjecting it to a current of approximately 40 amps. until a voltage of around 600 volts is reached and then continuing this voltage until the current decreases to substantially zero.

It is possible to utilize any of the common gelling agents employed in the art so as to form solid or semi-solid electrolytes using the aqueous solutions herein set forth. However, for most purposes it is believed to be preferred to use the specific solutes shown either alone or in combination with one another.

Various other modifications of the present inventive concept may be made by those skilled in the art without departing from the scope thereof. Such modifications are to be considered as part of the invention insofar as they are defined by the appended claims.

What is claimed is:

1. An electrolytic condenser comprising electrodes comprising at least one filmed electrode, a second electrode, and an aqueous solution of lithium chromate wherein said lithium chromate is present in the solution in at least a 5 molar concentration.

2. An electrolytic condenser comprising electrodes including at least one electrode having a film thereon, a second electrode, and an electrolyte comprising a 5 to 10 molar liquid solution of an alkali metal oxidizing salt in a solvent taken from the group consisting of water and organic solvents.

3. The electrolytic condenser of claim 2 wherein said solution is taken from the group consisting of an 8.0 molar aqueous solution of lithium chromate, a 7.0 molar solution of lithium nitrate in ethylene glycol, a 6.0 molar aqueous solution of potassium molybdate, an 8.0 molar aqueous solution of sodium permanganate, a 5.0 molar aqueous solution of lithium dichromate, and a 10 molar solution of sodium vanadate in dimethyl formamide.

4. An electrolytic capacitor comprising electrodes including at least one electrode having a dielectric film thereon, a second electrode and an electrolyte consisting essentially of a solution of a lithium salt of an oxidizing anion of the class consisting of chromate, dichromate, permanganate and nitrate there being at least a 5 molar concentration of said salt in the solution, the solvent of which is take from the group consisting of water and organic solvents.

5. An electrolytic capacitor comprising electrodes including at least one electrode having a dielectric film thereon, a second electrode and an electrolyte consisting essentially of a solution of a sodium salt of an oxidizing anion of the class consisting of chromate, dichromate, permanganate, nitrate and vanadate, there being at least 5 molar concentration of said salt in the solution, the solvent of which is taken from the group consisting of water and organic solvents.

6. An electrolytic capacitor comprising electrodes including at least one electrode having a dielectric film thereon, a second electrode and an electrolyte consisting essentially of a solution of at least a 5 molar concentration of potassium molybdate dissolved in a solvent of the group consisting of water and organic solvents.

References Cited in the file of this patent

UNITED STATES PATENTS

| 732,631 | Hambuechen | June 30, 1903 |
| 1,773,665 | Edelman | Aug. 19, 1930 |
| 2,014,169 | Edelman | Sept. 10, 1935 |
| 2,022,500 | Clark | Nov. 26, 1935 |
| 2,299,228 | Gray | Oct. 20, 1942 |
| 2,368,688 | Taylor | Feb. 6, 1945 |

FOREIGN PATENTS

| 933 | Great Britain | 1898 |